(12) United States Patent
Avkarogullari

(10) Patent No.: US 9,274,859 B2
(45) Date of Patent: Mar. 1, 2016

(54) MULTI PROCESSOR AND MULTI THREAD SAFE MESSAGE QUEUE WITH HARDWARE ASSISTANCE

(75) Inventor: Gokhan Avkarogullari, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1292 days.

(21) Appl. No.: 11/420,394

(22) Filed: May 25, 2006

(65) Prior Publication Data

US 2007/0288931 A1 Dec. 13, 2007

(51) Int. Cl.
G06F 9/44 (2006.01)
G06F 9/46 (2006.01)
G06F 9/54 (2006.01)

(52) U.S. Cl.
CPC .............. *G06F 9/544* (2013.01); *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 4,956,771 A * | 9/1990 | Neustaedter | 710/52 |
| 5,333,269 A * | 7/1994 | Calvignac | G06F 9/544 |
| | | | 709/215 |
| 5,925,099 A * | 7/1999 | Futral et al. | 709/204 |
| 5,999,969 A * | 12/1999 | Holmes | G06F 15/17306 |
| | | | 709/213 |
| 6,594,736 B1 * | 7/2003 | Parks | 711/151 |
| 6,799,317 B1 * | 9/2004 | Heywood | G06F 9/4812 |
| | | | 710/260 |
| 6,842,811 B2 * | 1/2005 | Barry et al. | 710/260 |
| 6,912,198 B2 * | 6/2005 | Dacosta | 370/229 |
| 7,210,022 B2 * | 4/2007 | Jungck | G06F 15/7864 |
| | | | 712/34 |
| 2002/0091826 A1 * | 7/2002 | Comeau | G06F 9/546 |
| | | | 709/226 |
| 2006/0143415 A1 * | 6/2006 | Naik | 711/163 |

FOREIGN PATENT DOCUMENTS

TW 200511023 A 3/2005

OTHER PUBLICATIONS

Bo I. Sandén, Real-time programming safety in Java and Ada, Ada User Journal 23:2 (Jun. 2002) 105-113.*
Dr. Lixin Tao; Interrupt Processing; Sep. 2002; 3 pages.*

* cited by examiner

*Primary Examiner* — H S Sough
*Assistant Examiner* — Kimberly Jordan

(57) ABSTRACT

A message exchange system for software components on different processors. A first component's attempt to load a write register with a message pointer (or a message itself) triggers a determination whether space exists in a shared memory queue. If so, the queue is updated by incrementing a message counter, writing the message/pointer into the queue where designated by a write pointer, and changing the write pointer to a next queue location. A second component's attempt to load the message/pointer from a read register triggers a determination whether there is at least one new message in the queue. If so, the queue is updated by decrementing the message counter, reading the message/pointer from the queue where designated by a read pointer, and changing the read pointer to point to a next queue location. The determinations and queue updates are performed atomically with respect to the software components.

32 Claims, 10 Drawing Sheets

For writing TOE (thread of execution):
    Take CPU (mutex) lock;
    Take spin lock;
    Write to msg queue;
    Release spin lock;
    Release CPU lock.

For reading TOE (thread of execution):
    Take COP (mutex) lock;
    Take spin lock;
    Read from msg queue;
    Release spin lock;
    Release COP lock.

FIG. 3a (Appendix, page 1 of 2)

Register Summary

| Address | Access | Size | Symbol | Description |
|---|---|---|---|---|
| | R/W | 32b | CPU.ThreadID | The ID for the current thread on CPU |
| | R/W | 32b | COP.ThreadID | The ID for the current thread on COP |
| | R/W | 32b | IPMQ.ADDR | The base address for the storage of the message addresses |
| | R/W | 32b | IPMQ.SIZE | The size of the message queue |
| | RO | 32b | IPMQ.ACCESS.RD | Read data from the queue |
| | WO | 32b | IPMQ.ACCESS.WR | Write data to the queue |
| | R/W | 32b | IPMQ.FULL.JMP | The jump address when writing to full queue |
| | R/W | 32b | IPMQ.EMPTY.JMP | The jump address when reading from empty queue |
| | R/W | 32b | IPMQ.CONTROL | Control register for the queue |
| | RO | 32b | IPMQ.PC | The program counter just before the jump |
| Internal | - | 7b | IPMQ.NMSGS | Internal register to keep track of the queue fullness level |
| Internal | - | 32b | IPMQ.RDPTR | Internal register to keep track of the next read location in the queue |
| Internal | - | 32b | IPMQ.WRPTR | Internal register to keep track of the next write location in the queue. |

Register Descriptions (CPU.ThreadID and COP.ThreadID)

Thread ID on CPU

| Bit | Name | Description |
|---|---|---|
| 31:0 | ID.31:ID.0 | The OS updates these bits with the ID of the new thread whenever a context switch occurs on CPU |

Thread ID on COP

| Bit | Name | Description |
|---|---|---|
| 31:0 | ID.31:ID.0 | The OS updates these bits with the ID of the new thread whenever a context switch occurs on COP |

CPU.ThreadID and COP.ThreadID have the same address. The value is based on which processor access is made from.

Base Address for Message Queue Storage (IPMQ.ADDR)

| Bit | Name | Description |
|---|---|---|
| 31:0 | ADR.31:ADR.0 | This is the starting address to store/fetch pointers to messages |

FIG. 3b (Appendix, page 2 of 2)

Size of the Message Queue Storage (IPMQ.SIZE)

| Bit | Name | Description |
|---|---|---|
| 31:0 | SZ31:SZ0 | This is the number of messages the message queue can hold. |

Message Queue Read Request (IPMQ.ACCESS.RD)

| Bit | Name | Description |
|---|---|---|
| 31:0 | MRD31:MRD:0 | Reads the next message from the queue. Causes a jump to IPMQ.EMPTY.JMP if the queue is empty. |

Message Queue Write Request (IPMQ.ACCESS.WR)

| Bit | Name | Description |
|---|---|---|
| 31:0 | MWR31:MWR:0 | Writes the next message from the queue. Causes a jump to IPMQ.FULL.JMP if the queue is full. |

Address for the Exception Handler for Write to a Full Queue (IPMQ.FULL.JMP)

| Bit | Name | Description |
|---|---|---|
| 31:0 | JMPF.31:JMPF.0 | When a write to IPMQ.ACCESS.WR cannot be serviced since the message storage space is full the processor jumps to this address |

Address for the Exception Handler for Read from an Empty Queue (IPMQ.EMPTY.JMP)

| Bit | Name | Description |
|---|---|---|
| 31:0 | JMPE.31:JMPE.0 | When a read from to IPMQ.ACCESS.RD cannot be serviced since the message storage space is empty (i.e. IPMQ.NMSGS is zero) the processor jumps to this address |

Message Queue Control Register

| Bit | Name | Description |
|---|---|---|
| 31 | MQC.31 | 1: Enables the message queue. Any write attempt to IPMQ.FULL.JMP, IPMQ.EMPTY.JMP, IPMQ.ADDR, IPMQ.SIZE will cause an exception<br>0: Disables the queue. Any access to IPMQ.ACCESS.WR or IPMQ.ACCESS.RD will cause an exception (e.g., an undefined instruction) |
| 1 | MQC.1 | 1: Queue_Read_Possible Interrupt happens upon the first write to queue after the queue was empty and there was a read request<br>0: Queue_Read_Possible Interrupt happens when the first time half of the queue is full after the queue was empty and there was a read request. |
| 0 | MQC.0 | 1: Queue_Write_Possible Interrupt happens upon the first read from queue after the queue was full and there was a write request<br>0: Queue_Write_Possible Interrupt happens when the first time half of the queue is full after the queue was full and there was a write request. | ic
MULTI PROCESSOR AND MULTI THREAD SAFE MESSAGE QUEUE WITH HARDWARE ASSISTANCE

TECHNICAL FIELD

The present invention relates generally to interprogram or interprocess communication in electrical computers and digital processing systems, and more particularly to such communication using shared memory.

BACKGROUND ART

Shared memory is usually employed when multiple processors exchange messages. That is, when a first processor (which we herein term "CPU") writes a message into the shared memory so that a second processor (which we herein term "COP") can then read the message from the shared memory. Maintaining the integrity of the messages thus exchanged requires that any updating of the content of the message be performed "atomically" with respect to the software threads of execution.

Multiple processor safe message queues are typically implemented using such shared memory, as well as with locks and asynchronous signaling. The messages are put in the shared memory, and then read and written only after certain precautions are taken. For instance, the reader or writer software thread that creates the message will acquire a multi processor safe lock (usually implemented using a "spin lock"). And, when necessary, it will also acquire a single processor multi thread safe lock (usually termed a mutual exclusion lock or "mutex").

FIGS. 1a-c are schematic block diagrams wherein FIG. 1a stylistically depicts the general hardware (HW) environment of interest and FIGS. 1b-c depict the regular software (SW) operations necessary in prior art schemes.

There are usually also a few "corner conditions" that need to be considered. For instance, one needs to deal with the special case when a read is attempted but the message queue is empty, and one also needs to deal with the special case when a write is attempted but the message queue is full. Asynchronous signaling is typically used to handle these conditions (e.g., signaling after the first write to an empty message queue to wake up a waiting reader thread). Such asynchronous signaling is usually implemented by one processor interrupting another, and then within an interrupt service routine (ISR) signaling with a semaphore to wake up the blocked thread.

Unfortunately, all of these locking and signaling mechanisms require significant software design and implementation effort and significant runtime overhead.

Let us consider an example based on a spin lock. If a first thread running on CPU (a first processor) has acquired the spin lock and is preempted by another thread on CPU (the first processor), and then a third thread on the COP (the second processor) tries to get the spin lock it will be blocked for a long time until the first threads becomes active again and then releases the spin lock. Spin locks are usually implemented as polling within a loop that runs forever until the condition is met. As can be appreciated, this scheme may result in a temporary priority inversion, wherein a very high priority task on COP is delayed because a lower priority thread on CPU has ownership which is preempted by an unrelated higher priority thread on CPU. This scheme can also easily cause significant wait time, wherein COP becomes essentially useless while waiting on a favorable polling result. Which has ownership is preempted by an unrelated higher priority thread on CPU.

Similarly, the use of a mutex imposes another overhead. Some operating systems (OSes) and real time OSes (RTOSes) take a significant amount of time to acquire a mutex even when the resource it is protecting is available.

Accordingly, what is still needed is a more efficient system for multiple processors to exchanges messages. This system should preferably eliminate the need to employ software-based mechanisms such as the spin lock and the mutual exclusion lock (mutex).

DISCLOSURE OF INVENTION

Accordingly, it is an object of the present invention to provide an improved system for multiple processors to exchanges messages.

Briefly, one preferred embodiment of the present invention is a method for a first software component running on a first computerized processor to write a message to a shared memory that is accessible by a second software component running on a second computerized processor. An attempt is made by the first software component to load a message queue write register with a message token that is a pointer to the message (or that is the message itself). Triggered by this, a determining is made whether there is space for the message token in a message queue in the shared memory. This determination is performed atomically with respect to the software components. If space is available, the message queue is updated, also atomically with respect to the software components, by incrementing a message counter, writing said message token into said message queue at a location designated by a write pointer, and changing said write pointer to point to a next location in said message queue.

Briefly, another preferred embodiment of the present invention is a method for a second software component running on a second computerized processor to read a message from a shared memory that is accessible by a first software component running on a first computerized processor. An attempt is made by the second software component to load a message token from a message queue read register, wherein said message token is a pointer to the message (or is the message itself) that is stored in a message queue in the shared memory. Triggered by this, a determining is whether said message token is new, thereby indicating whether there is at least one new message in the message queue in the shared memory. This determination is performed atomically with respect to the software components. If there is a new message, the message queue is updated, also atomically with respect to the software components, by decrementing a message counter, reading said message token from said message queue at a location designated by a read pointer, and changing said read pointer to point to a next location in said message queue.

An advantage of the present invention is that it provides a hardware-based protected atomic update mechanism that gets rid of the software spin lock and the mutual exclusion locks entirely.

Another advantage of the invention is that it makes the implementation of multiple processor message exchange significantly easier in the software employing it.

And another advantage of the invention is that it significantly lowers the runtime overhead associated with multiple processor message exchange.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIGS. 3a-b are an appendix of tables describing exemplary data structures used by the embodiment of the inventive hardware assistance system in FIG. 2.

FIGS. 4a-c are flow charts depicting initializations of the HW aspect of FIG. 2, wherein FIG. 4a shows a reset sub-routine, FIG. 4b shows a boot sub-routine, and FIG. 4c shows an initialization sub-routine.

In the various figures of the drawings, like references are used to denote like or similar elements or steps.

BEST MODE FOR CARRYING OUT THE INVENTION

Figures 1A, 1B, 1C:
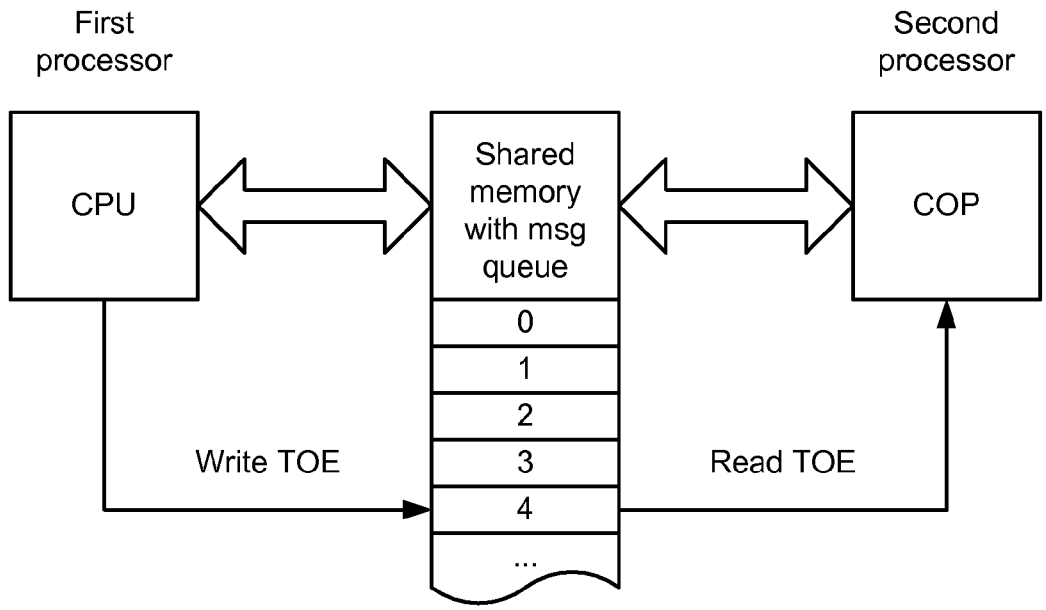
FIGS. 1a-c are schematic block diagrams wherein FIG. 1a (background art) stylistically depicts the general hardware (HW) environment of interest and FIGS. 1b-c (prior art) depict the regular software (SW) operations necessary in prior art schemes.

A preferred embodiment of the present invention is a multiple processor and multiple thread safe message queue with hardware assistance. As illustrated in the various drawings herein, and particularly in the view of FIG. 2, preferred embodiments of the invention are depicted by the general reference character 10.

Simply put, the present inventor has observed that the deficiencies in the prior art approach to multi-processor messaging are due to the processors, and particularly the operating system (OS) or the OSes in them, being only loosely tied to the actual hardware resources that they use for message exchange, i.e., the shared memory and the message queue in it. Conversely, this has lead the inventor to the realization that the way to obtain more optimal use of the entire system is to have the hardware resources provide assistance.

Figure 2:
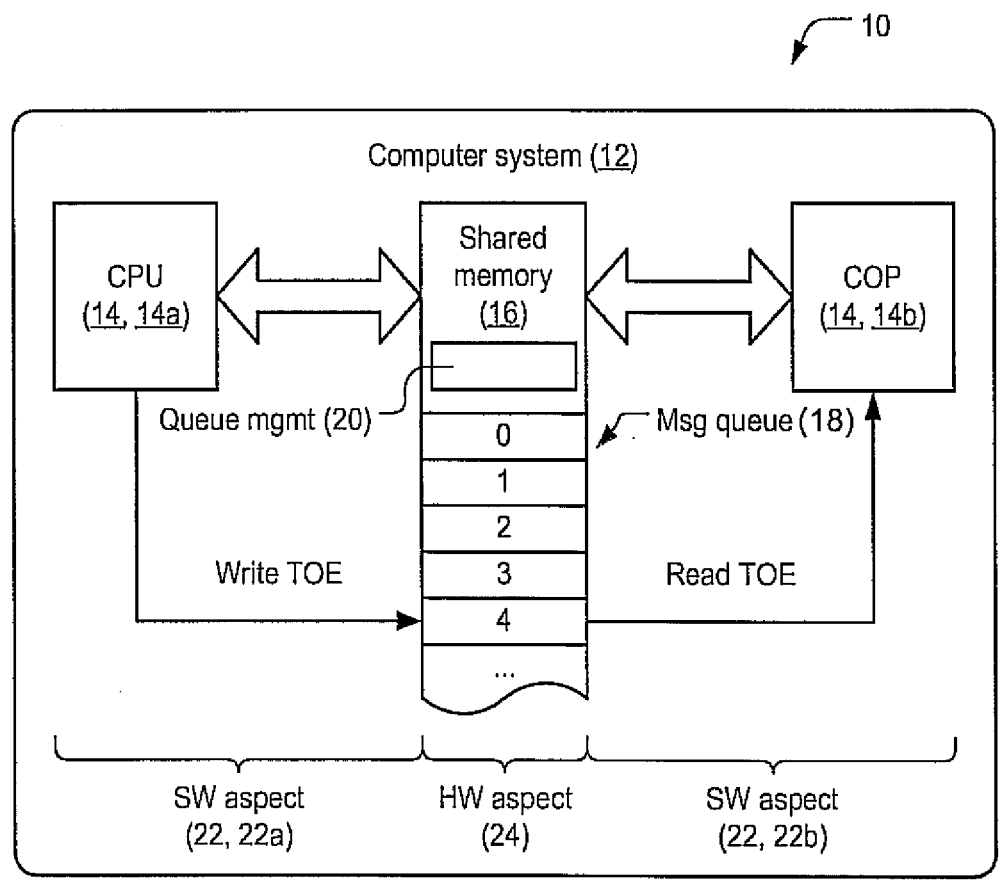
FIG. 2 is a schematic block diagram depicting how an embodiment of a hardware assistance system in accord with the present invention relates to a modern computer system.

With reference briefly back to FIG. 1a and now also to the schematic block diagram in FIG. 2, it can be appreciated how the inventive hardware assistance system 10 relates to a modern computer system 12. For the sake of simplicity our exemplary computer system 12 here includes only two processors 14 (CPU 14a and COP 14b), a set of shared memory 16 that includes a message queue 18, and a queue management unit 20. Generally, and especially for the sake of the following disclosure, the computer system 12 can be viewed as having a software aspect (generally, SW aspect 22 and specifically SW component 22a for CPU 14a and SW component 22b for COP 14b) and a hardware aspect (HW aspect 24). The SW aspect 22 includes the processors 14 (CPU 14a and COP 14b), with their attendant OSes and software threads of execution (SW component 22a and SW component 22b). Although somewhat awkward in the general computing context, but consistent here for reasons that will become apparent, the processors 14 (CPU 14a and COP 14b) are included in the SW aspect 22. In contrast, the HW aspect 24 includes the hardware resources (shared memory 16, message queue 18, and queue management unit 20) used by the SW aspect 22 to exchange messages between the processors 14 (CPU 14a and COP 14b).

To illustrate how the inventive hardware assistance system 10 can eliminate the use of spin locks, mutexes, and other multi-processor resource sharing software-based lock mechanisms, a usage scenario is now presented wherein software (SW) works with hypothetical hardware (HW) programming registers to implement an inter-processor message queue. Five major cases are considered here:

Case 1: Set-up of the HW aspect 24, particularly including:
Initialization of the HW aspect 24 (done once only at reset);
The SW aspect 22 making the HW aspect 24 ready to be used by the computer system 12 (done once only at boot time); and
The SW aspect 22 initializing the HW aspect 24 for use during run time (potentially performed many times between any two resets).

Case 2: The SW aspect 22 writing a message to a message queue 18;

Case 3: The SW aspect 22 reading a message from the message queue 18; and

Case 4: A read-after-full interrupt service routine (ISR) that runs when certain (later explained) conditions are met.

Case 5: A write-after-empty ISR that runs when certain (later explained) conditions are met.

FIGS. 3a-b are an appendix of tables describing exemplary data structures used by the embodiment of the inventive hardware assistance system 10 about to be discussed. These data structures generally need to be accessible by both processors 14 (CPU 14a and COP 14b), so they can be implemented in the shared memory 16. Much here is self explanatory, and many elements will be discussed in passing, presently. But some elements here also merit the following introduction.

There should be processor specific thread identification registers (CPU.ThreadID) that is updated by the scheduler at every context switch.

There should be a register to temporarily hold the program counter (IPMQ.PC) so a SW aspect 22 can return to the starting point when exceptional cases are handled.

There should be a base address register (IPMQ.ADDR) to program the starting address of the storage space for the message queue ("IPMQ").

There should be a register to program the size of the message queue (IPMQ.SIZE).

There should be a register used to read a message (IPMQ.ACCESS.RD). Typically this will be implemented to contain a pointer to a location where the actual message is stored, since the message size in most cases will be larger than a pointer size and this approach will me more efficient.

There should be a register used to write a message (IPMQ.ACCESS.WR). Similarly, for efficiency, this will also usually be implemented to contain a pointer rather than the actual message.

There should be some space in shared memory 16 generally that is accessible by both processors (CPU 14a and COP 14b) where the messages and/or message pointers are stored.

There should be a control register (IPMQ.CONTROL) to control the HW aspect 24.

There should be a register (IPMQ.FULL.JMP) to hold the instruction address where the jump takes place upon an attempt to write to a message queue that is full (i.e., the read-after-full interrupt service ISR).

There should be a register (IPMQ.EMPTY.JMP) to hold the instruction address where the jump takes place upon an attempt to read from a message queue that is empty (i.e., the write-after-empty ISR).

The message queue 18 can be implemented in many ways, but it is assumed here that it is implemented as a circular buffer. It is further assumed here that the HW aspect 24 internally manages a message counter (IPMQ.NMSGS), a read pointer (IPMQ.RDPTR), and a write pointer (IPMQ.WRPTR). Furthermore, a waiting list or lists for read and write semaphores should be provided by the HW aspect 24.

Figure 4A:
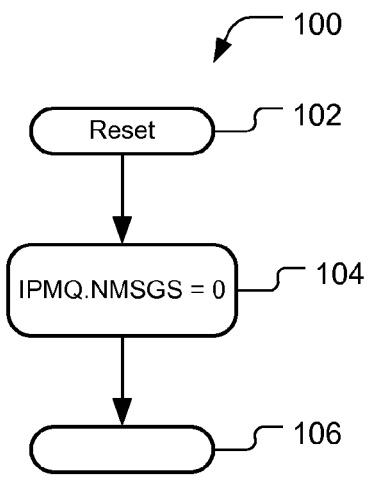
Figure 4B:
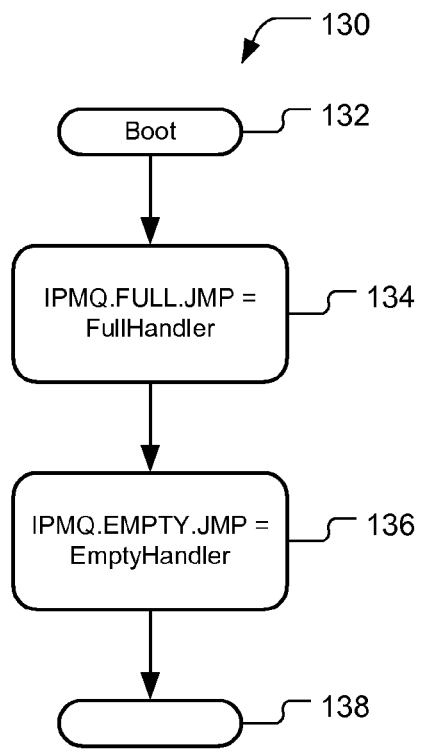
Figure 4C:
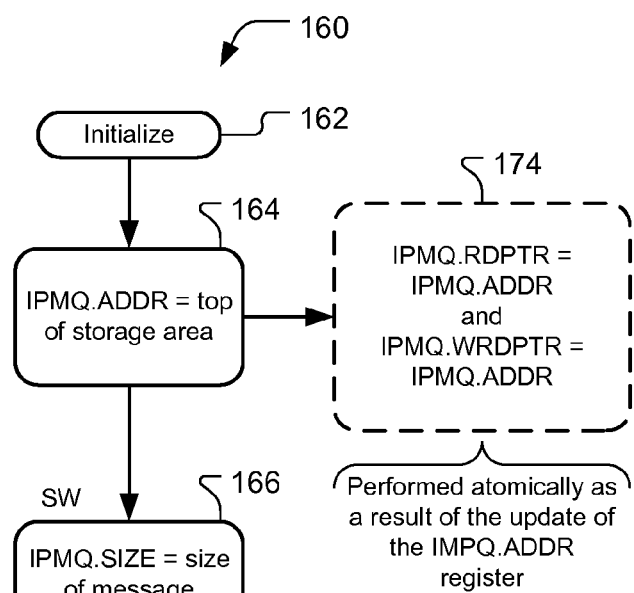

FIGS. 4a-c are flow charts depicting initializations of the HW aspect 24 (Case 1), wherein FIG. 4a shows a reset sub-routine 100 (Case 1.A), FIG. 4b shows a boot sub-routine 130 (Case 1.B), and FIG. 4c shows an initialization sub-routine 160 (Case 1.C).

Starting with FIG. 4a, the reset sub-routine 100 is entered in a step 102 (note, this resetting of the message queue 18 takes place after the HW aspect 24 has initially been reset or powered-up). Then, in a step 104 the HW aspect 24 initializes its internal message counter (IPMQ.NMSGS) to zero. And in a step 106 the reset sub-routine 100 is exited. The HW aspect 24 is now reset.

Turning next to FIG. 4b, the boot sub-routine 130 is entered in a step 132. Then, in a step 134 the SW aspect 22 initializes the first jump to instruction register (IPMQ.FULL.JMP) pointing to a FullHandler method. Similarly, in a step 136 the SW aspect 22 initializes the second jump to instruction register (IPMQ.EMPTY.JMP) pointing to an EmptyHandler method. And in a step 138 the boot sub-routine 130 is exited. The HW aspect 24 is now ready for initialization.

And turning to FIG. 4c, the initialization sub-routine 160 is entered in a step 162. Then, in a step 164 the SW aspect 22 programs the base address (IPMQ.ADDR) of the message queue 18 in the shared memory 16, and in a step 166 the SW aspect 22 programs the size (IPMQ.SIZE) of the message queue 18. In a step 168 the SW aspect 22 specifies the preferred mode for controlling read interrupts, and in a step 170 the SW aspect 22 specifies the preferred mode for controlling write interrupts. The "ready for read" interrupt may be generated either after the first write to an empty message queue 18 and there was a request for a read (i.e., IPMQ.CONTROL.MCQ.1=1), or the first time half of the message queue 18 becomes full after a queue empty condition was hit and there was a request for a read (i.e., IPMQ.CONTROL.MCQ.1=0). The "ready for write" interrupt may be generated either after the first read from a full message queue 18 and there was a request for a write (i.e., IPMQ.CONTROL.MCQ.0=1), or the first time half of the message queue 18 becomes empty after a queue full condition was hit and there was a request for a write (i.e., IPMQ.CONTROL.MCQ.0=0). In a step 172 the SW aspect 22 sets the enable bit in the control register (IPMQ.CONTROL.MCQ.31). If the HW aspect 24 is used before this is set it causes an exception (e.g., a data abort exception). Meanwhile, as a result of the SW aspect 22 having programmed the base address (step 164), in a step 174 the HW aspect 24 initializes its internal registers that keep track of the next read location (IPMQ.RDPTR) and the next write location (IPMQ.WRPTR) in the message queue 18.

Case 1 for set-up of the HW aspect 24 is now finished.

Figure 5A:
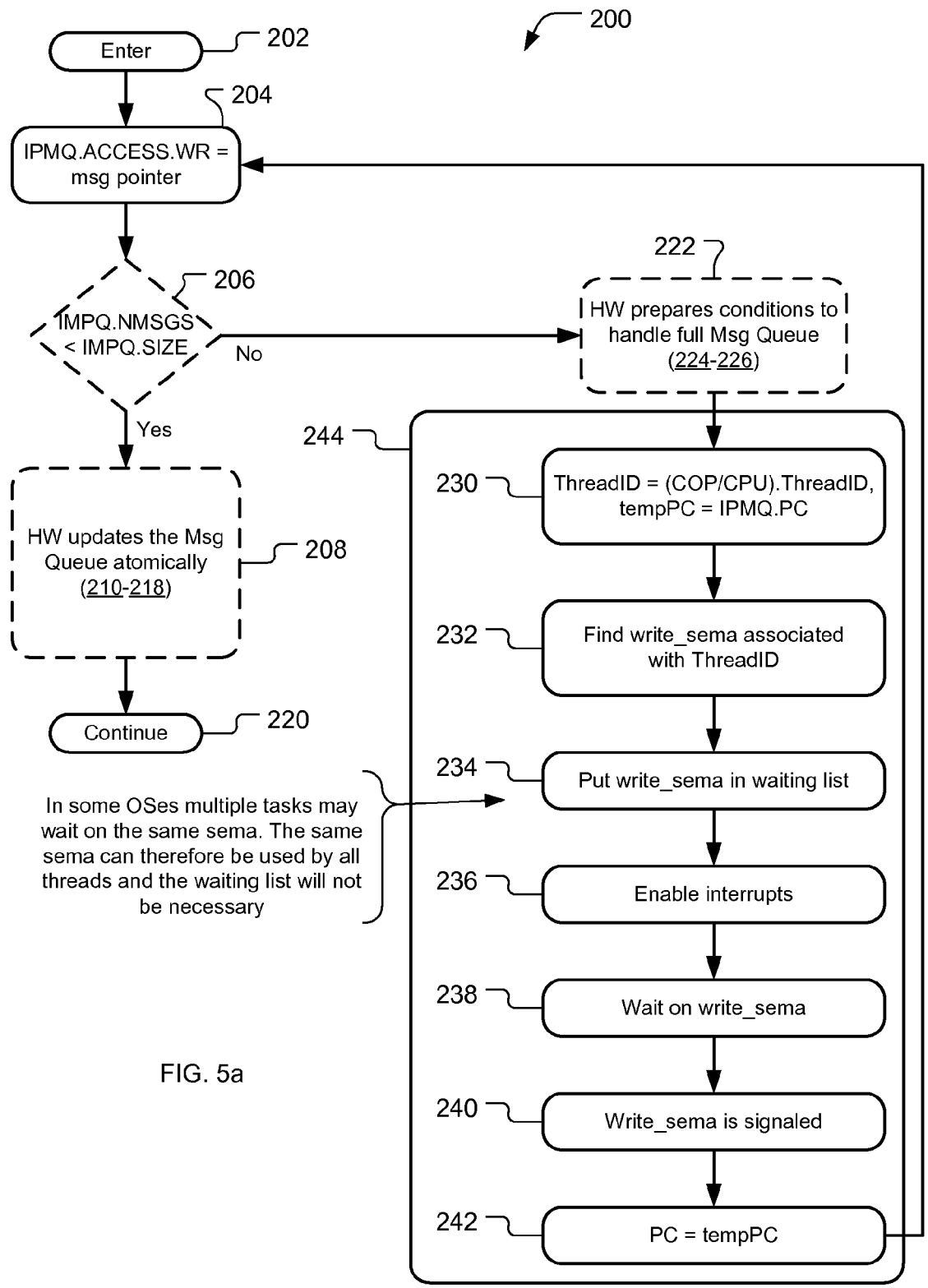
FIGS. 5a-c are flowcharts depicting a message writing sub-process for writing a message to the message queue in FIG. 2.
Figure 5B:
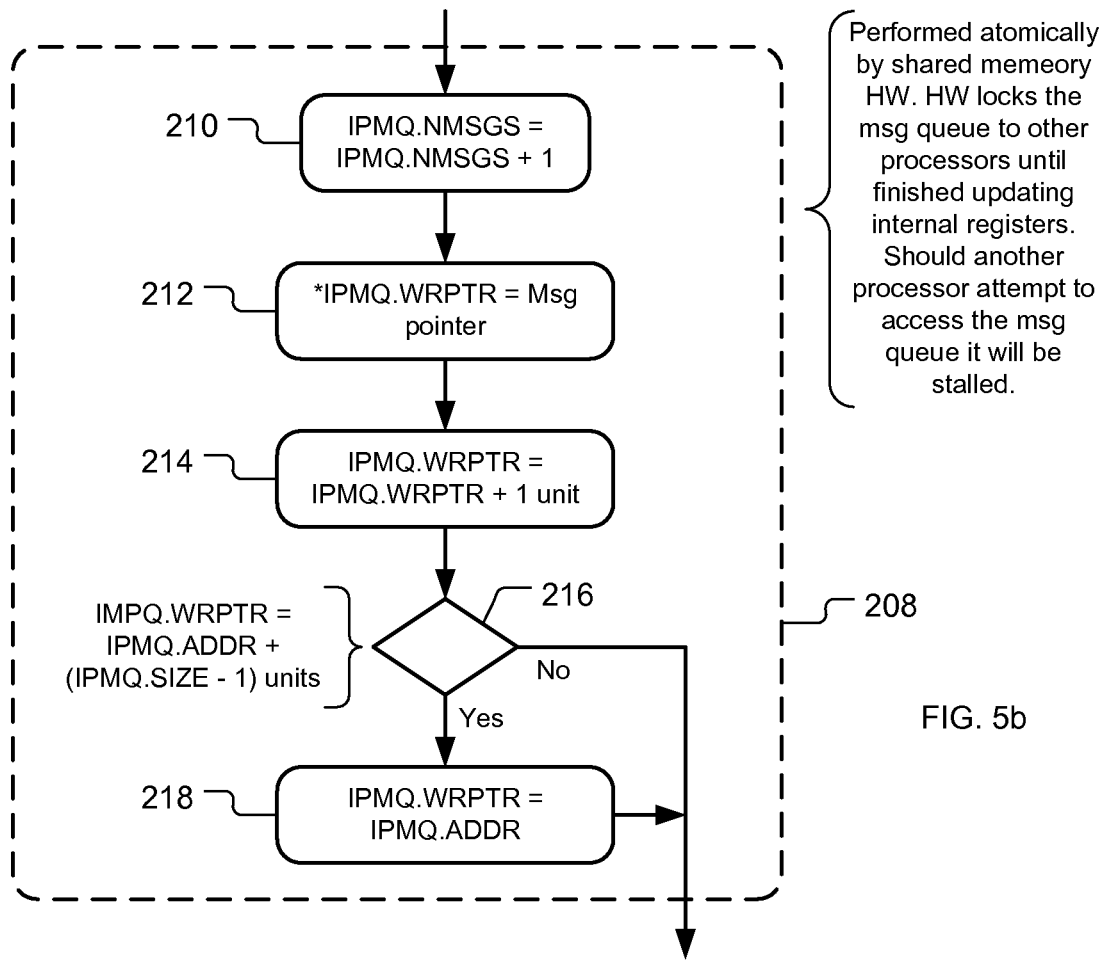
Figure 5C:
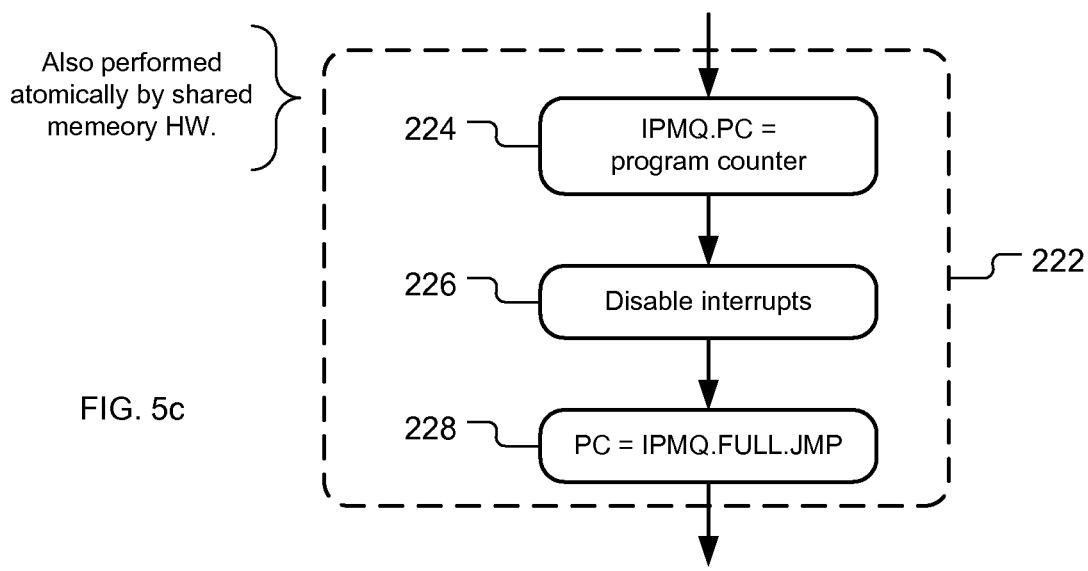

FIGS. 5a-c are flowcharts depicting a message writing sub-process 200 for writing a message to the message queue 18 (Case 2). Briefly, the SW aspect 22 attempting to load a pointer to a message (or a message itself) into the message queue write register starts a chain of operations where either the message is written to the message queue 18 or the thread of execution in the SW aspect 22 is put into a block wait condition.

The message writing sub-process 200 is entered in a step 202. In a step 204 the SW aspect 22 attempts to load the message queue write register (IPMQ.ACCESS.WR) with a message pointer. In a step 206 the HW aspect 24 determines if there is space in the message queue 18 (comparing IPMQ.NMSGS to IPMQ.SIZE here, although other techniques can also be used).

If there is space, in a section 208 (shown in detail in FIG. 5b) the HW aspect 24 internally updates the message queue 18 (both step 206 and section 208 are atomic with respect to the SW aspect 22 and exclusive to a single processor (CPU 14a or COP 14b)). In a step 210 the HW aspect 24 increments the message counter (IPMQ.NMSGS). In a step 212 the HW aspect 24 copies the value written to the IPMQ.ACCESS.WR register to the memory pointed to by the IPMQ.WRPTR register. In a step 214 the HW aspect 24 increments the IPMQ.WRPTR by one unit (e.g., by 4 bytes if that is the natural pointer size). In a step 216 the HW aspect 24 determines whether the IPMQ.WRPTR value is pointing to one unit after the last space in the message queue 18 in the circular buffer. If so, in a step 218 the HW aspect 24 resets the pointer to the start of the circular buffer (IPMQ.ADDR). And then, or if not, in a step 220 the HW aspect 24 returns (i.e., the message writing sub-process 200 for writing a message exits).

If there is not space (determined in step 206; the message counter is equal to the size of the queue), the message queue 18 is full and in a section 222 (shown in detail in FIG. 5c) the HW aspect 24 prepares to handle this (both step 206 and section 222 are also atomic with respect to the SW aspect 22 and exclusive to a single processor 14). In a step 224 the HW aspect 24 copies the program counter to a temporary space (IPMQ.PC), in a step 226 the HW aspect 24 disables interrupts, and in a step 228 the HW aspect 24 sets the program counter to the FullHandler method (via IPMQ.FULL.JMP).

Collectively, within the message writing sub-process 200, steps 230-242 constitute the FullHandler method 244.

In a step 230 the SW aspect 22 reads the (current) thread ID and makes a local copy (tempPC) of the temporary program counter register (IPMQ.PC). In a step 232 the SW aspect 22 finds the write semaphore associated with this thread, and in a step 234 the SW aspect 22 puts that semaphore in a waiting list. [Note, in some OSes there may be multiple waiters on a single semaphore. For such as a case the SW implementer may choose to use the same semaphore for all threads and not use a waiting thread list since the OS itself internally would keep a waiting thread list.]

In a step 236 the SW aspect 22 enables interrupts, and in a step 238 the SW aspect 22 is blocked waiting on the semaphore. At some point, when the other processor reads a message from the message queue 18 (or when half of the messages in the queue depending on the control register settings) it will cause an interrupt to be generated and that interrupt will signal this semaphore (see FIG. 7 and discussion provided below). Accordingly, in a step 240 the semaphore is signaled and the SW aspect 22 is unblocked. In a step 242 the SW aspect 22 sets the program counter to the saved temporary copy of the program counter (in IPMQ.PC). The net result of this is that the SW aspect 22 ends up where it started, writing a message to the write message register. And now that the message queue 18 has space this attempt should be successful.

Summarizing, the SW aspect 22 "sees" (1) step 204 as being followed by step 220 (if there is space and the message is written into the message queue 18), since step 206 and section 208 are atomic with respect to the SW aspect 22. Or (2) the SW aspect 22 "sees" step 204 as being followed by steps 230-242 (if there was not space), since step 206 and section 222 are atomic with respect to the SW aspect 22. Case 2 for writing a message to the message queue 18 is now finished.

Figure 6A:
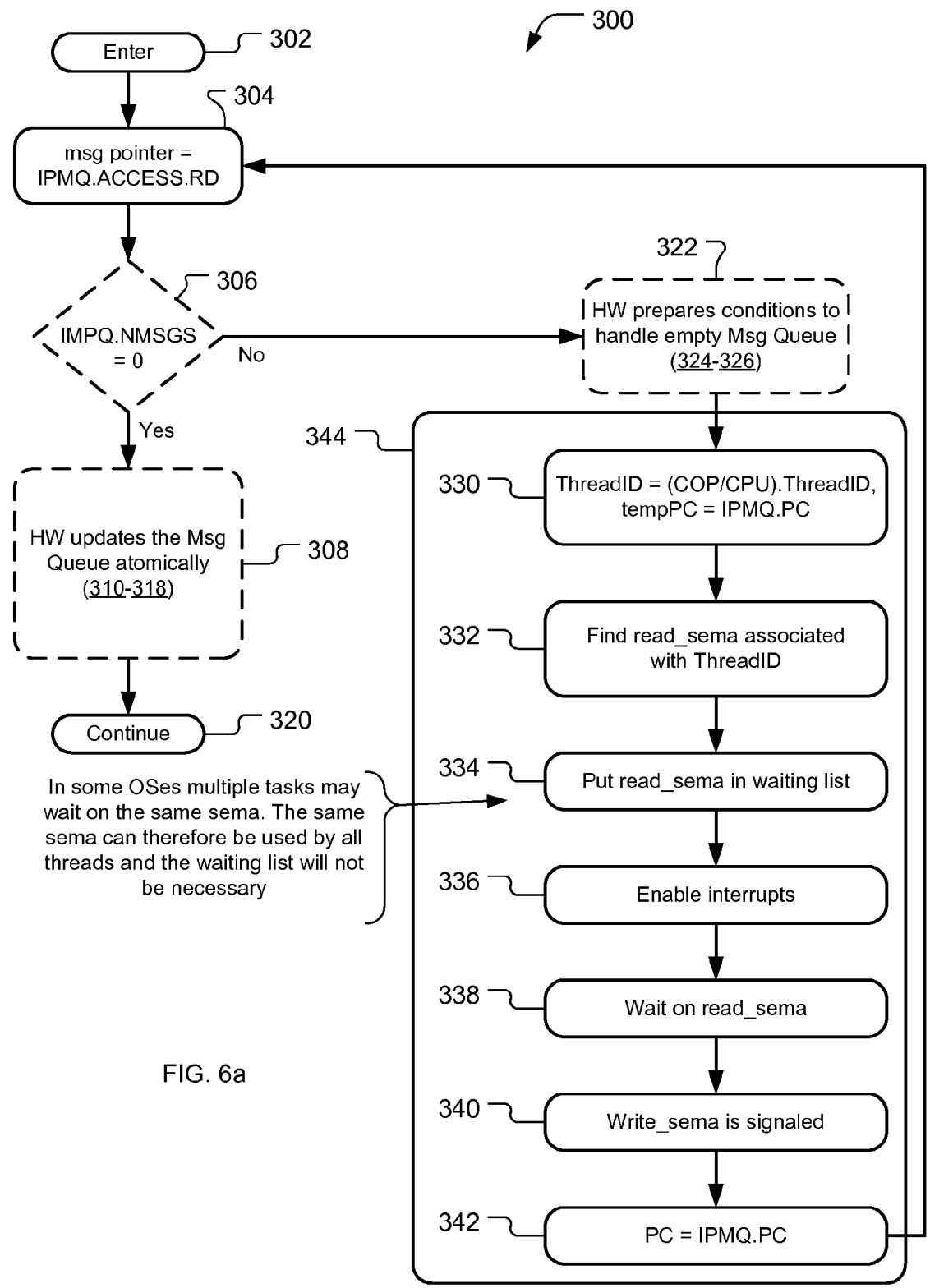
FIGS. 6a-c are flowcharts depicting a message reading sub-process for reading a message from the message queue in FIG. 2.
Figure 6B:
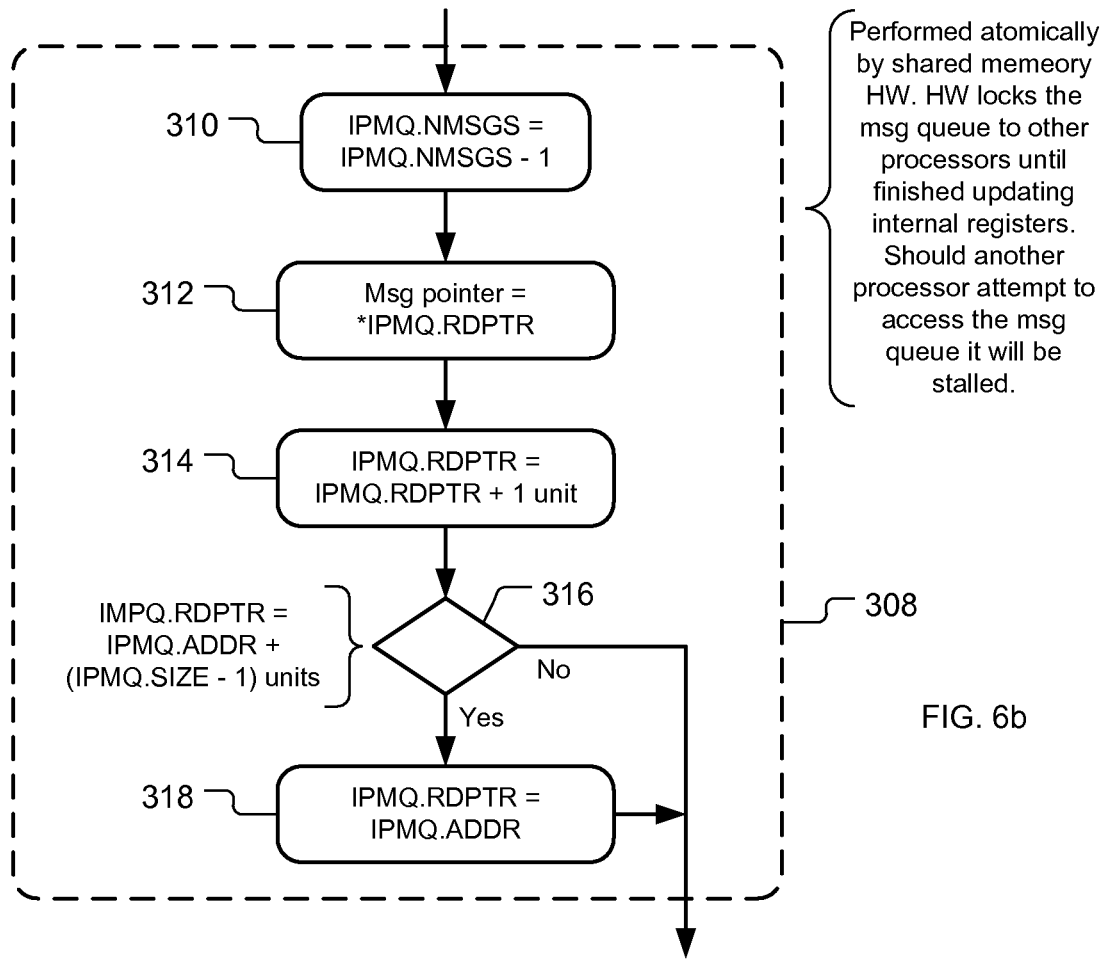
Figure 6C:
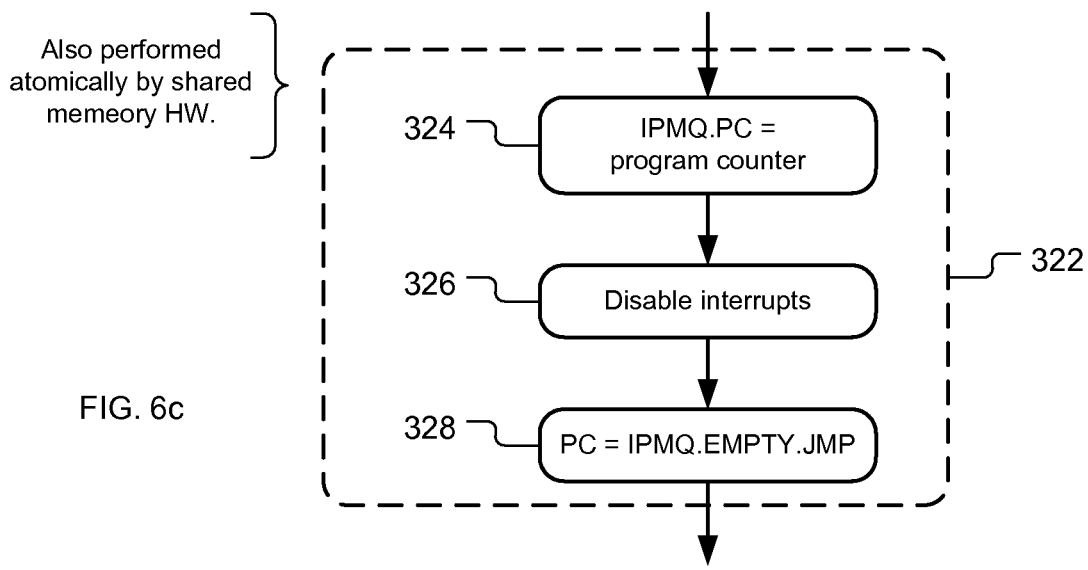

FIGS. 6a-c are flowcharts depicting a message reading sub-process 300 for reading a message from the message queue 18 (Case 3). Briefly, the SW aspect 22 attempting to load a pointer to a message (or a message itself) from the message queue read register starts a chain of operation where either the message is read from the message queue 18 or the thread of execution in the SW aspect 22 is put into a block wait condition.

The message reading sub-process 300 is entered in a step 302. In a step 304 the SW aspect 22 attempts to load a message pointer from the message queue read register (IPMQ.ACCESS.RD). In a step 306 the HW aspect 24 determines if there is an unread message in the message queue 18 (here by examining IPMQ.NMSGS).

If there is at least one message in the message queue 18, in a section 308 (shown in detail in FIG. 6b) the HW aspect 24 internally updates the message queue 18 (both step 306 and section 308 are atomic with respect to the SW aspect 22 and exclusive to a single processor). In a step 310 the HW aspect 24 decrements the message counter (IPMQ.NMSGS). In a step 312 the HW aspect 24 copies the value of the memory pointed to by the IPMQ.RDPTR register to the general purpose register specified by the read instruction. In a step 314 the HW aspect 24 increments the IPMQ.RDPTR by one unit (e.g., by 4 bytes if that is the natural pointer size). In a step 316 the HW aspect 24 determines whether the IPMQ.RDPTR value is pointing to one unit after the last space in the message queue 18 in the circular buffer. If so, in a step 318 the HW aspect 24 resets the pointer to the start of the circular buffer. And then, or if not, in a step 320 the HW aspect 24 returns (i.e., the message reading sub-process 300 for reading a message exits).

If the message counter is zero (step 306), the message queue 18 is empty and in a section 322 (shown in detail in FIG. 6c) the HW aspect 24 prepares to handle this (both step 306 and section 322 are also atomic with respect to the SW aspect 22 and exclusive to a single processor 14). In a step 324 the HW aspect 24 copies the program counter to a temporary space (IPMQ.PC), in a step 326 the HW aspect 24 disables interrupts, and in a step 328 the HW aspect 24 sets the program counter to the EmptyHandler method (via IPMQ.EMPTY.JMP).

Collectively, within the message reading sub-process 300, steps 330-342 constitute the EmptyHandler method 344.

In a step 330 the SW aspect 22 reads the (current) thread ID and makes a local copy (tempPC) of the temporary program counter register (IPMQ.PC). In a step 332 the SW aspect 22 finds the read semaphore associated with this thread, and in a step 334 the SW aspect 22 puts that semaphore in the waiting list. [Note, in some OSes there may be multiple waiters on a single semaphore. For such as a case the SW implementer may choose to use the same semaphore for all threads and not use a waiting thread list since the OS itself internally would keep a waiting thread list.]

In a step 336 the SW aspect 22 enables interrupts, and in a step 338 the SW aspect 22 is blocked waiting on the semaphore. At some point, when the other processor writes a message to the message queue 18 (or fills in half of the message queue 18, depending on the control register settings) it will cause an interrupt to be generated and that interrupt will signal this semaphore (see FIG. 8 and discussion provided below). Accordingly, in a step 340 the semaphore is signaled and the SW aspect 22 is unblocked. In a step 342 the SW aspect 22 sets the program counter to the to the saved temporary copy of the program counter (in IPMQ.PC). The net result is that the SW aspect 22 ends up where it started, reading a message from the read message register. And now that the message queue 18 has a message this attempt will be successful.

Summarizing, the SW aspect 22 "sees" (1) step 304 as being followed by step 320 (if there is at least one message in the message queue 18), since step 306 and section 308 are atomic with respect to the SW aspect 22. Or (2) the SW aspect 22 "sees" step 304 as being followed by steps 330-342 (if there were no messages), since step 306 and section 322 are atomic with respect to the SW aspect 22. Case 3 for reading a message from the message queue 18 is now finished.

Figure 7:
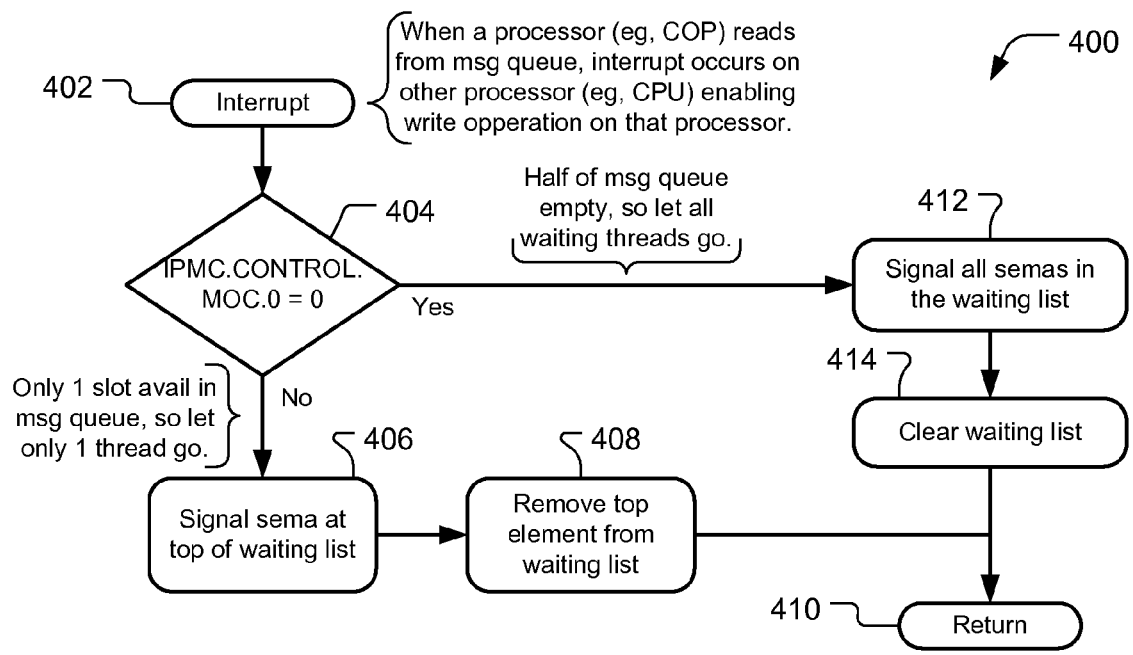
FIG. 7 is a flowchart depicting a read-after-full interrupt service routine (ISR) that runs when an interrupt is caused by a read after the message queue is full.

FIG. 7 is a flowchart depicting a read-after-full ISR 400 that runs when an interrupt is caused by a read after the message queue 18 is full (Case 4). Briefly, when one processor (e.g., COP 14b) reads from the message queue 18, an interrupt occurs on the other processor (CPU 14a) to enable a write operation to take place on that processor (CPU 14a). For this to happen the message queue 18 must become full and there must be a request to write a message to the message queue 18. Depending on a setting in a control register (that is programmable in this embodiment), this can happen either after the first read after the above conditions are met or after there have been enough messages read that half of the space in the message queue 18 is empty. [Alternately, there can be another register that specifies after how many reads this interrupt should occur. There is no reason that embodiments of the inventive hardware assistance system 10 have to be limited to just a single read or half full condition. A half full condition is merely one possibility, and using another exact number in another register is another possibility.]

The read-after-full ISR 400 is entered in a step 402, and the SW aspect 22 performs the following. In a step 404 the SW aspect 22 determines whether the interrupt happened after a first read or after half of the message queue 18 become empty (checking the IPMQ.CONTROL.MCQ.0 bit here, although other techniques can also be used).

If after one message, in a step 406 the SW aspect 22 signals the semaphore at the top of the waiting thread list, and in a step 408 the SW aspect 22 pops (removes) the top element from the waiting thread list. [If all threads use the same semaphore, there will not be a waiting thread list and only one thread will become unblocked, depending on the OS implementation.] And in a step 410 the SW aspect 22 returns (i.e., the read-after-full ISR 400 is finished).

If the interrupt happened after half of the message queue 18 became empty (determined in step 404), in a step 412 the SW aspect 22 signals all of the semaphores in the waiting thread list, and in a step 414 the SW aspect 22 clears the waiting thread list. [If all threads use the same semaphore, there will not be a waiting list. The SW aspect 22 should then use a different method on the semaphore to notify all waiters or, alternatively, the SW aspect 22 can keep track of the number of waiters and signal the same semaphore that many times and reset that value.] Here as well, in step 410 the SW aspect 22 returns.

Case 4 for the read-after-full ISR 400 is now finished.

Figure 8:
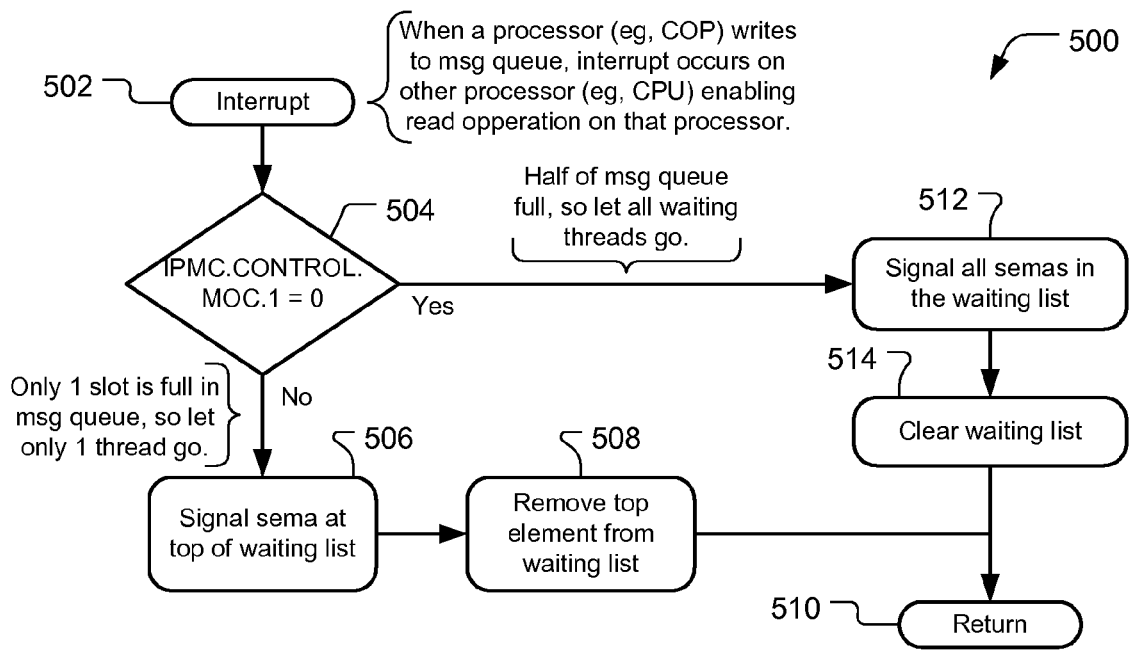
FIG. 8 is a flowchart depicting a write-after-empty ISR that runs when an interrupt is caused by a write while the message queue 18 is empty.

FIG. 8 is a flowchart depicting a write-after-empty ISR 500 that runs when an interrupt is caused by a write while the message queue 18 is empty (Case 5). Briefly, when one processor (e.g., COP 14*b*) writes to the message queue 18, an interrupt occurs on the other processor (CPU 14*a*) to enable a read operation to take place on that processor (CPU 14*a*). For this to happen the message queue 18 must become empty and there must be a request to read a message from the message queue 18. Depending on a setting in a control register (that is programmable in this embodiment), this can happen either after the first write after the above conditions are met or after there have been enough messages written that half of the space in the message queue 18 is full. [Here as well, there alternately can be another register that specifies after how many writes this interrupt should occur. There is no reason that embodiments of the inventive hardware assistance system 10 have to be limited to just a single write or half full condition. A half full condition is merely one possibility, and using another exact number in another register is another possibility.]

The write-after-empty ISR 500 is entered in a step 502, and the SW aspect 22 performs the following. In a step 504 the SW aspect 22 determines whether the interrupt happened after a first write or after half of the message queue 18 become full (checking the IPMQ.CONTROL.MCQ.1 bit here, although other techniques can also be used).

If after one message, in a step 506 the SW aspect 22 signals the semaphore at the top of the waiting thread list, and in a step 508 the SW aspect 22 pops (removes) the top element from the waiting thread list. [If all threads use the same semaphore, there will not be a waiting thread list and only one thread will become unblocked, depending on the OS implementation.] And in a step 510 the SW aspect 22 returns (i.e., the write-after-empty ISR 500 is finished).

If the interrupt happened after half of the message queue 18 became full (determined in step 504), in a step 512 the SW aspect 22 signals all of the semaphores in the waiting thread list, and in a step 514 the SW aspect 22 clears the waiting thread list. [If all threads use the same semaphore, there will not be a waiting list. The SW aspect 22 should then use a different method on the semaphore to notify all waiters or, alternatively, the SW aspect 22 can keep track of the number of waiters and signal the same semaphore that many times and reset that value.] Here as well, in step 510 the SW aspect 22 returns.

Case 5 for the write-after-empty ISR 500 is now finished.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A method of updating a message queue, said method comprising:
   storing, in a message queue, a first message token associated with a first message, wherein said message queue is coupled to a first processor and a second processor;
   determining if there is sufficient space in said message queue for a second message token associated with a second message;
   if it is determined that sufficient space exists in said message queue for said second message token, updating said message queue by initiating a writing of said second message token into said message queue; and
   if it is determined that sufficient space does not exist in said message queue for said second message token, responsive to the determination that sufficient space does not exist in said message queue preparing to put a software component into a wait condition by copying a program counter into a temporary space, disabling interrupts and setting a program counter to a full handler sub-method wherein a hardware component disables said interrupts and a software component later enables said interrupts.

2. The method of claim 1, wherein said second message token comprises data selected from a group consisting of said second message and a pointer to said second message.

3. The method of claim 1, wherein said updating further comprises updating said message queue by writing said second message token into said message queue at a location designated by a write pointer, and wherein said updating further comprises changing said write pointer to point to a second location in said message queue.

4. The method of claim 1, wherein said determining and said updating are performed atomically with respect to respective software components of said first processor and said second processor.

5. The method of claim 1, wherein said message queue is implemented using a shared memory coupled to said first processor and said second processor.

6. The method of claim 1, wherein said determining further comprises determining if there is sufficient space in said message queue for said second message token in response to an attempt by said first processor to write said second message token into a write register, wherein said updating further comprises updating said message queue by writing said second message token from said write register into said message queue.

7. The method of claim 1, wherein said causing further comprises causing said software component of said first processor to wait until sufficient space exists in said message queue for said second message token.

8. The method of claim 1 further comprising:
   determining that said message queue is full; and
   responsive to said determining that said message queue is full, interrupting said second processor to enable said second processor to perform a read operation on said message queue to create space in said message queue for said second message token.

9. A method of updating a message queue, said method comprising:
   storing, in a message queue, a message token associated with a message, wherein said message queue is coupled to a first processor and a second processor;
   determining if said message token has been previously accessed;
   if it is determined that said message token has not been previously accessed, updating said message queue by initiating a reading of said message token from said message queue; and
   if it is determined that said message token has been previously accessed, copying a program counter into a temporary space, disabling interrupts and setting a program counter to a full handler sub-method wherein a software component of said second processor is placed in a wait condition using a semaphore in response to the determination that said message token has been previously accessed wherein a hardware component disables said interrupts and a software component later enables said interrupts.

10. The method of claim 9, wherein said message token comprises data selected from a group consisting of said message and a pointer to said message.

11. The method of claim 9, wherein said updating further comprises updating said message queue by reading said message token from said message queue at a location designated by a read pointer, and wherein said updating further comprises changing said read pointer to point to a second location in said message queue.

12. The method of claim 9, wherein said determining and said updating are performed atomically with respect to respective software components of said first processor and said second processor.

13. The method of claim 9, wherein said message queue is implemented using a shared memory coupled to said first processor and said second processor.

14. The method of claim 9, wherein said determining further comprises determining if said message token in said message queue has been previously accessed in response to an attempt by said second processor to load said message token from a read register.

15. The method of claim 9, wherein said causing further comprises causing said software component of said second processor to wait until said message queue is updated with a second message token that has not been previously accessed.

16. The method of claim 9 further comprising:
determining that said message queue is empty; and
responsive to said determining that said message queue is empty, interrupting said first processor to enable said first processor to perform a write operation on said message queue to write said message token into said message queue.

17. A system comprising:
a first processor;
a second processor;
a message queue operable to store a first message token associated with a first message, wherein said message queue is further operable to enable exchange of said first message between said first processor and said second processor; and
a message queue management unit operable to determine if there is sufficient space in said message queue for a second message token associated with a second message, wherein said message queue management unit is further operable to update said message queue by initiating a writing of said second message token into said message queue if it is determined that sufficient space exists in said message queue for said second message token, and wherein said message queue management unit is further operable to be put into a wait condition, wherein a program counter is copied into a temporary space, interrupts are disabled and a program counter is set to a full handler sub-method in response to a determination that sufficient space does not exist in said message queue for said second message token wherein a hardware component disables said interrupts and a software component later enables said interrupts.

18. The system of claim 17, wherein said message token comprises data selected from a group consisting of said second message and a pointer to said second message.

19. The system of claim 17, wherein said message queue management unit is further operable to update said message queue by initiating a writing of said second message token into said message queue at a location designated by a write pointer, and wherein said message queue management unit is further operable to change said write pointer to point to a second location in said message queue.

20. The system of claim 17, wherein said message queue management unit is further operable to determine if there is sufficient space in said message queue and update said message queue atomically with respect to respective software components of said first processor and said second processor.

21. The system of claim 17, wherein said message queue and said message queue management unit are implemented using a shared memory coupled to said first processor and said second processor.

22. The system of claim 17 further comprising:
a write register coupled to said message queue management unit;
wherein said message queue management unit is further operable to determine if there is sufficient space in said message queue for said second message token in response to an attempt by said first processor to write said second message token into said write register; and
wherein said message queue management unit is further operable to update said message queue by writing said second message token from said write register into said message queue.

23. The system of claim 17, wherein said message queue management unit is further operable to wait said software component of said first processor until sufficient space exists in said message queue for said second message token.

24. The system of claim 17, wherein said message queue management unit is further operable to determine that said message queue is full, and wherein said message queue management unit is further operable to interrupt said second processor to enable said second processor to perform a read operation on said message queue to create space in said message queue for said second message token.

25. A system comprising:
a first processor;
a second processor;
a message queue operable to store a message token associated with a message, wherein said message queue is further operable to enable exchange of said first message between said first processor and said second processor; and
a message queue management unit operable to determine if said message token has been previously accessed, wherein said message queue management unit is further operable to update said message queue by initiating a reading of said message token from said message queue if it is determined that said message token has not been previously accessed, and wherein said message queue management unit is further operable to wait, wherein a program counter is copied into a temporary space, interrupts are disabled and a program counter is set to a full handler sub-method if it is determined that said message token has been previously accessed wherein a hardware component disables said interrupts and a software component later enables said interrupts.

26. The system of claim 25, wherein said message token comprises data selected from the group consisting of said message and a pointer to said message.

27. The system of claim 25, wherein said message queue management unit is further operable to update said message queue by initiating a reading of said message token from said message queue at a location designated by a read pointer, and wherein said message queue management unit is further operable to change said read pointer to point to a second location in said message queue.

28. The system of claim 25, wherein said message queue management unit is further operable to determine if said message token has been previously accessed and update said message queue atomically with respect to respective software components of said first processor and said second processor.

29. The system of claim 25, wherein said message queue and said message queue management unit are implemented using a shared memory coupled to said first processor and said second processor.

30. The system of claim 25 further comprising:
a read register coupled to said message queue management unit; and
wherein said message queue management unit is further operable to determine if said message token has been previously accessed in response to an attempt by said second processor to load said message token from said read register.

31. The system of claim 25, wherein said message queue management unit is further operable to wait said software component of said second processor until said message queue is updated with a second message token that has not been previously accessed.

32. The system of claim 25, wherein said message queue management unit is further operable to determine that said message queue is empty, and wherein said message queue management unit is further operable to interrupt said first processor to enable said first processor to perform a write operation on said message queue to write said message token into said message queue.

* * * * *